United States Patent
Li et al.

(10) Patent No.: US 11,754,143 B1
(45) Date of Patent: Sep. 12, 2023

(54) LASER WELDED DAMPER HAVING ENHANCED FATIGUE PERFORMANCE

(71) Applicant: GM Global Technology Operations LLC, Detroit, MI (US)

(72) Inventors: Huaxin Li, Rochester Hills, MI (US); Jianghuai Yang, Rochester Hills, MI (US); James D. Cremonesi, Rochester Hills, MI (US); Mark R. Claywell, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/825,279

(22) Filed: May 26, 2022

(51) Int. Cl.
| | |
|---|---|
| *F16F 15/10* | (2006.01) |
| *B23K 26/22* | (2006.01) |
| *F16F 15/22* | (2006.01) |
| *F16F 15/14* | (2006.01) |
| *F16F 15/24* | (2006.01) |
| *F16H 55/36* | (2006.01) |

(52) U.S. Cl.
CPC .............. *F16F 15/14* (2013.01); *B23K 26/22* (2013.01); *F16F 15/24* (2013.01); *F16F 2226/048* (2013.01); *F16F 2232/02* (2013.01); *F16H 2055/366* (2013.01)

(58) Field of Classification Search
CPC ...... F16F 15/14; F16F 15/1457; F16F 15/167; F16F 15/24; F16F 15/26; F16F 15/31; F16F 2222/08; F16F 2224/0208; F16F 2226/048; F16F 2232/02; B23K 26/22; F16H 2055/366
See application file for complete search history.

(56) References Cited

U.S. PATENT DOCUMENTS

| | | | | |
|---|---|---|---|---|
| 1,815,807 A | * | 7/1931 | Stamm .................... | F16F 15/14 74/574.2 |
| 2,636,399 A | * | 4/1953 | O'Connor ........... | F16F 15/1442 29/523 |
| 2,824,467 A | * | 2/1958 | O'Connor ............. | F16F 15/173 74/573.13 |
| 4,386,728 A | * | 6/1983 | Torok ..................... | B23K 15/10 219/121.64 |

(Continued)

FOREIGN PATENT DOCUMENTS

| | | | |
|---|---|---|---|
| CN | 203453380 U | * | 2/2014 |
| DE | 1775390 A1 | * | 9/1971 |

(Continued)

*Primary Examiner* — Adam D Rogers
(74) *Attorney, Agent, or Firm* — Vivacqua Crane PLLC

(57) ABSTRACT

A damper for suppressing vibrations of a crankshaft of a vehicle is disclosed. The damper comprises a hub having a circular wall extending about a rotational axis to define a bore formed therethrough. The wall comprises a step portion radially extending therefrom and having a first arcuate portion formed thereon. The hub comprises a body portion radially extending from the wall to a lip to define an open cavity. The damper comprises a weld nugget disposed between the hub and the plate. The weld nugget has a root extending therethrough concurrent with the rotational axis to join the hub and the plate. The root has tip defining a profile such that the hollow channel is disposed at an angle tangent to the profile to lessen cracking due to stress.

20 Claims, 2 Drawing Sheets

(56) References Cited

U.S. PATENT DOCUMENTS

| | | | | |
|---|---|---|---|---|
| 4,872,369 A | * | 10/1989 | Critton | B23K 26/206 |
| | | | | 74/573.1 |
| 4,953,778 A | * | 9/1990 | Critton | B21D 22/16 |
| | | | | 228/173.6 |
| 5,862,897 A | * | 1/1999 | Allport | F16F 15/173 |
| | | | | 464/68.4 |
| 5,979,390 A | * | 11/1999 | Depp | F01L 1/02 |
| | | | | 123/192.1 |
| 10,605,327 B2 | * | 3/2020 | Knopf | F16F 15/173 |
| 2021/0381580 A1 | * | 12/2021 | Reinsperger | F16F 15/173 |

FOREIGN PATENT DOCUMENTS

| | | | | |
|---|---|---|---|---|
| DE | 10135910 A1 | * | 2/2003 | F16F 15/173 |
| EP | 0620380 A1 | * | 10/1994 | |
| JP | 06159444 A | * | 6/1994 | |

* cited by examiner

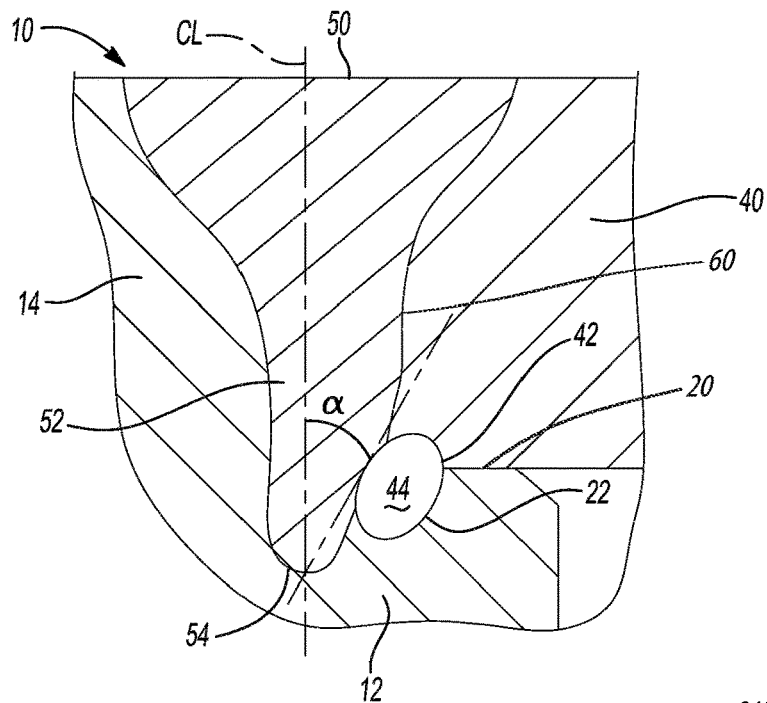
FIG. 4
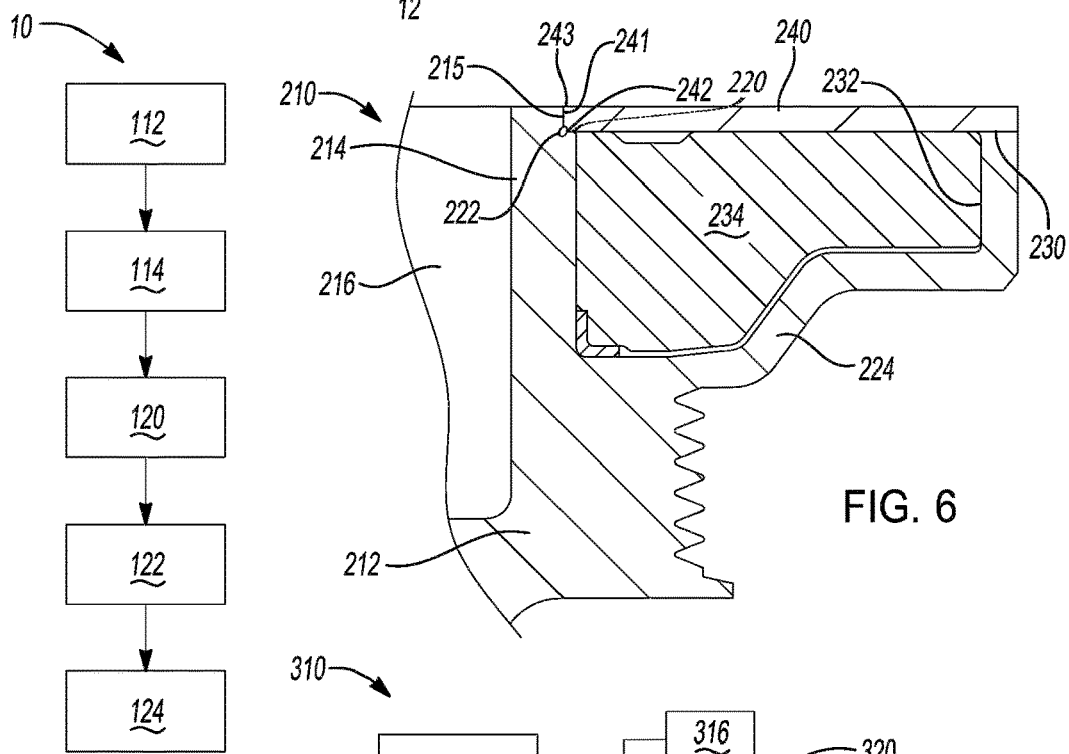
FIG. 6
FIG. 5
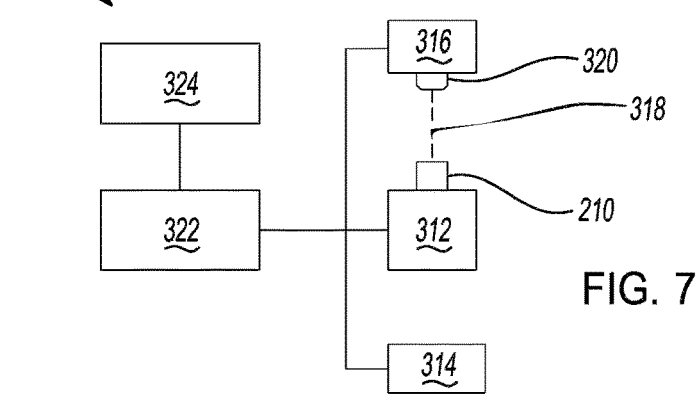
FIG. 7

LASER WELDED DAMPER HAVING ENHANCED FATIGUE PERFORMANCE

INTRODUCTION

The present disclosure relates to dampers for vehicle crankshafts and, more particularly, laser welded dampers having enhanced fatigue performance.

Dampers for vehicle crankshafts help decrease vibrations therein but are subject to heavy stress conditions. Heavy stress conditions may include centrifugal stress on a weld, vibrations which generate stress to the weld, and rise to internal temperature, all of which generate bending stresses on the weld. Such conditions may lead to cracks in the weld of a damper.

SUMMARY

Thus, while current dampers achieve their intended purpose, there is a need for a new and improved system and method for making a laser welded damper having enhanced fatigue performance.

According to one aspect of the present disclosure, a damper for suppressing vibrations of a crankshaft of a vehicle is disclosed. The damper comprises a hub having a circular wall extending about a rotational axis of the damper to define a bore formed therethrough. The wall comprises a step portion radially extending therefrom and has a first arcuate portion formed thereon. The hub comprises a body portion radially extending from the wall to a lip to define an open cavity. The damper further comprises an inertia ring disposed in the open cavity to provide damper inertia.

In this aspect, the damper further comprises a plate disposed on the lip of the hub and extends to the step of the wall to close the inertia ring in the open cavity. The plate is in abutment with the wall and has a second arcuate portion arranged to be in cooperation with the first arcuate portion defining a hollow channel radially disposed about the wall of the hub.

The damper further comprises a weld nugget formed between the hub and the plate. The weld nugget has a root extending therethrough concurrent with the rotational axis to join the hub and the plate. The root extends to a tip defining a profile such that the hollow channel is disposed at an angle tangent to the profile to lessen cracking due to stress.

In one embodiment, the angle of the hollow channel is between 10° and 50° relative to the rotational axis. In another embodiment, the angle of the hollow channel is between 15° and 30° relative to the rotational axis. In yet another embodiment, the angle of the hollow channel is between 20° and 25° relative to the rotational axis.

In an embodiment, the hollow channel has a cross section having an oval shape. In another embodiment, the hollow channel has a cross section having a circular shape. In yet another embodiment, the hollow channel has a cross section having a rectangular shape.

In another aspect of the present disclosure, a method of making a laser welded damper having enhanced fatigue performance is provided. The method comprises providing a hub having a circular wall extending about a rotational axis of the damper to define a bore formed therethrough. The wall has a first faying surface and comprises a step portion radially extending therefrom. The step has a first arcuate portion formed thereon. The hub comprises a body portion radially extending from the wall to a lip to define an open cavity.

The method further comprises providing an inertia ring disposed in the open cavity to provide damper inertia. The method further comprises providing a plate disposed on the lip of the hub and extending to the step of the wall to close the inertia ring in the open cavity. The plate has a second faying surface and is in abutment with the first faying surface of the wall. The plate has a second arcuate portion arranged to be in cooperation with the first arcuate portion defining a hollow channel radially disposed about the wall of the hub.

In this aspect, the method further comprises arranging the wall and the plate such that the first and second faying surfaces are in abutting contact. Moreover, the method further comprises directing a laser beam onto an external surface of the hub effective to form a weld nugget disposed between the hub and the plate. The weld nugget has a root extending therethrough concurrent with the rotational axis to join the hub and the plate. The root has a tip defining a profile such that the hollow channel is disposed at an angle tangent to the profile to lessen cracking due to stress and stress concentration.

In one example, the angle of the hollow channel is between 10° and 50° relative to the rotational axis. The angle of the hollow channel may also be between 15° and 30° relative to the rotational axis. In another embodiment, the angle of the hollow channel is between 20° and 25° relative to the rotational axis.

In one example, the hollow channel has a cross section having an oval shape. In another example, the hollow channel has a cross section having a circular shape. In yet another example, the hollow channel has a cross section having a rectangular shape.

In another aspect of the present disclosure, a damper for suppressing vibrations of a crankshaft of a vehicle is provided. The damper comprises a hub having a circular wall extending about a rotational axis of the damper to define a bore formed therethrough. The wall comprises a step portion radially extending therefrom and has a first arcuate portion formed thereon. The hub comprises a body portion radially extending from the wall to a lip to define an open cavity.

In this aspect, the damper further comprises an inertia ring disposed in the open cavity to provide damper inertia. The damper further comprises a plate disposed on the lip of the hub and extending to the step of the wall to close the inertia ring in the open cavity. The plate is in abutment with the wall and has a second arcuate portion arranged to be in cooperation with the first arcuate portion defining a hollow channel radially disposed about the wall of the hub.

Moreover, the damper further comprises a weld nugget disposed between the hub and the plate. The weld nugget has a root extending therethrough concurrent with the rotational axis to join the hub and the plate. The root has a tip defining a profile such that the hollow channel is disposed at an angle tangent to the profile to lessen cracking due to stress and stress concentration. The angle of the hollow channel is between 10° and 50° relative to the rotational axis.

In one embodiment, the angle of the hollow channel is between 15° and 30° relative to the rotational axis. In another embodiment, the angle of the hollow channel is between 20° and 25° relative to the rotational axis.

In an embodiment, the hollow channel has a cross section having an oval shape. In another embodiment, the hollow channel has a cross section having a circular shape. In yet another embodiment, the hollow channel has a cross section having a rectangular shape.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is an enlarged view of the damper of FIG. 3.

FIG. 5 is a flowchart of a method of laser welding the damper of FIG. 1 in accordance with one example of the present disclosure.

FIG. 6 is a partial cross-sectional side view of a damper prior to laser welding in accordance with one embodiment of the present disclosure.

FIG. 7 is a schematic view of a system for laser welding the damper of FIG. 1 by way of the method of FIG. 5 in accordance with one example of the present disclosure.

DETAILED DESCRIPTION

The following description is merely exemplary in nature and is not intended to limit the present disclosure, application, or uses.

Aspects of the present disclosure provides a laser welded damper having enhanced fatigue performance. The damper comprises a hollow channel formed radially about a weld root and disposed at an angle tangent thereof. High stress that otherwise would have been on the weld is shifted to the base metal of the damper, thereby reducing stress concentration on the weld. As a result, fatigue life of the damper is enhanced and the damper maintains improved weld integrity.

Figure 1:
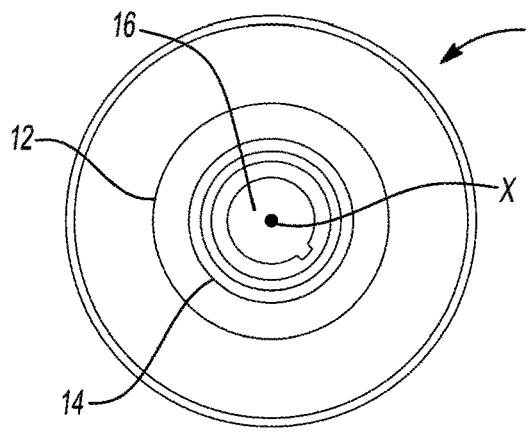
FIG. 1 is a plan or top view of a laser welded damper having enhanced fatigue in accordance with one embodiment of the present disclosure.
Figure 2:
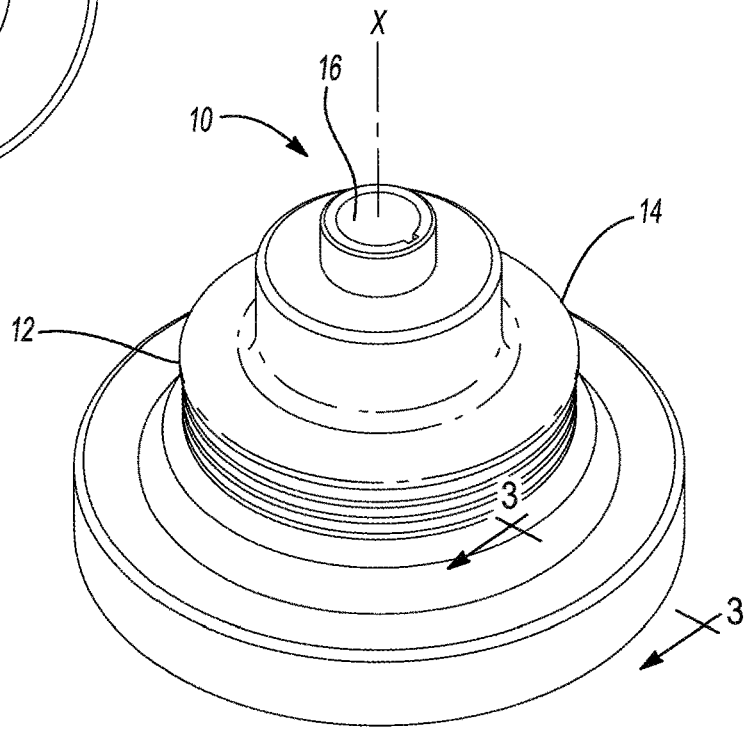
FIG. 2 is a perspective view of the damper in FIG. 1.

FIGS. 1-2 illustrate a damper 10 for suppressing vibrations of a crankshaft of a vehicle in accordance with one embodiment of the present disclosure. As shown, the damper 10 comprises a hub 12 having a circular wall 14 extending about a rotational axis of the damper 10 to define a bore 16 formed therethrough. In operation, the bore 16 is to be mated with the nose of a vehicle crankshaft. As it can be seen, the rotational axis defines a centerline CL of the damper 10. Moreover, the circular wall 14 comprises a step portion 20 radially extending therefrom and having a first arcuate portion 22 formed thereon. As shown, the hub 12 further comprises a body portion 24 radially extending from the circular wall 14 to a lip 30, defining an open cavity 32. In one embodiment, the hub comprises aluminum alloys some of which are known blends such as AA2000, 4000, 6000, and 7000 in T6 temper. Such alloys are selected for high strength, wear resistance, and weldability.

Figure 3:
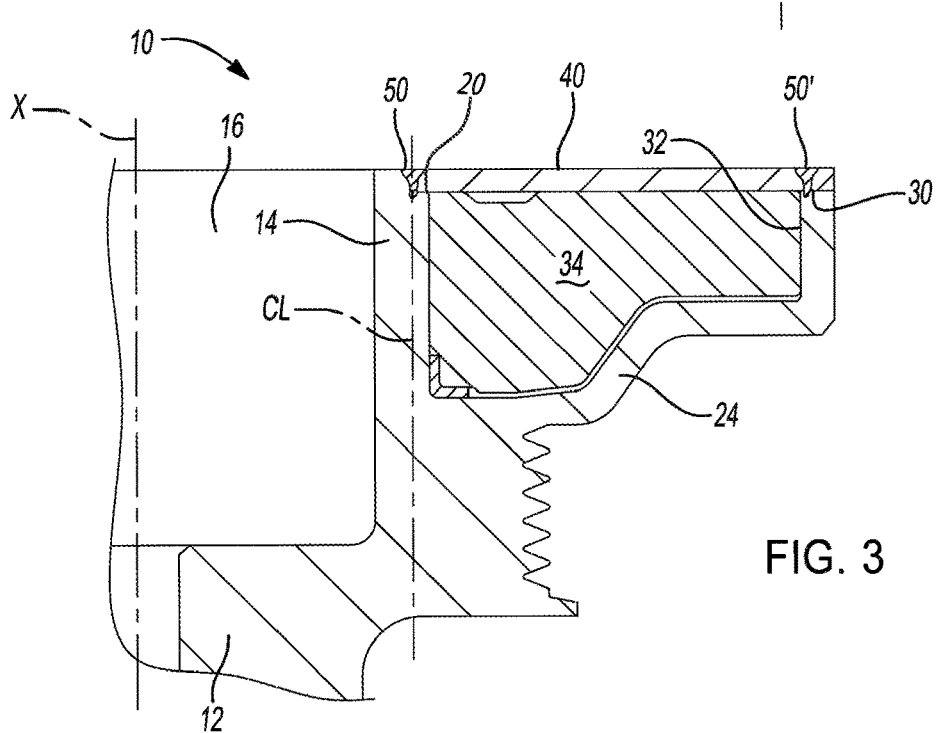
FIG. 3 is a partial cross-sectional side view of the damper in FIG. 2 taken along lines 3-3.

The damper 10 further comprises an inertia ring 34 disposed in the open cavity 32 to provide damper inertia. Referring to FIGS. 1-3, the damper 10 further comprises a cover plate 40 disposed on the lip 30 of the hub 12 and extends to the step 20 of the wall 14 to close the inertia ring 34 in the open cavity 32. As shown, the plate 40 is in abutment with the wall 14 and has a second arcuate portion 42 arranged to be in cooperation with the first arcuate portion 22, defining a hollow channel 44 radially disposed about the wall 14 of the hub 12.

The cover plate may comprise aluminum alloys some of which are known blends such as AA4000, AA5000, and AA6000. Such alloys may be heat treated or cold worked for high strength and weldability potential of the weld. Moreover, the inertia ring may be comprised of aluminum alloy, cast or forged. Additionally, viscous silicone may be used to fill the remainder of the cavity.

The damper 10 further comprises a weld nugget 50 formed between the hub 12 and the plate 40 preferably by way of laser welding (discussed below). As also shown, the damper comprises a weld nugget 50' formed through the plate 40 extending to the lip 32. The weld nugget 50 has a root 52 extending into and between the wall 14 and the cover plate 40. As shown, the weld nugget 50 extends concurrently with the rotational axis to join the hub 12 and the plate 40. The root 52 extends to a tip 54 defining a profile 60 such that the hollow channel 44 is disposed at an angle α tangent to the profile 60 to lessen cracking due to stress.

Being disposed at an angle tangent to the profile, the hollow channel 44 provides for enhance fatigue performance of the damper 10. That is, high stress that otherwise would have been on the weld 50 is shifted to the base metal such as the hub 12 or the plate 40. Thus, stress concentration on the weld 50 is reduced to suppress premature fatigue cracks from formation and therefore increase fatigue life of the damper 10. Additionally, the hollow channel 44 serves as a reservoir for welding gas, improves weld integrity, and lowers a detrimental effect of gas porosity which otherwise leads to a deteriorated weld fatigue life.

As shown in FIG. 4, the hollow channel 44 is arranged tangent to the profile 60 at the angle relative to the centerline. In this embodiment, the angle of the hollow channel 44 is between 10° and 50° relative to the centerline. Preferably, the angle of the hollow channel 44 is between 15° and 30° relative to the rotational axis. More preferably, the angle of the hollow channel 44 is between 20° and 25° relative to the rotational axis.

Additionally, the hollow channel 44 is shown to have a cross section having an oval shape. In another embodiment, the hollow channel 44 has a cross section having a circular shape, a rectangular shape, or any other suitable shape without departing from the scope or spirit of the present disclosure.

Moreover, the channel may have a size of between 0.8 millimeter (mm) and 1.5 mm in diameter when in a shape of a circle. Additionally, the channel may have a size of between 0.8 mm and 1.5 mm for long and short axes when in a shape of an oval.

FIG. 5 depicts a flowchart of a method 110 of making the laser welded damper 10 of FIGS. 1-4 having enhanced fatigue performance in accordance with one example of the present disclosure. As shown in FIGS. 5 and 6, the method 110 comprises in box 112 providing a hub 212 having a circular wall 214 extending about a rotational axis of the damper 10 to define a bore 216 formed therethrough. The wall 214 has a first faying surface 215 and comprises a step portion 220 radially extending therefrom. The step portion 220 has a first arcuate portion 222 formed thereon. The hub 212 comprises a body portion 224 radially extending from the wall 214 to a lip 230 to define an open cavity 232. In one example, the hub 212 comprises aluminum alloys some of which are known blends such as AA2000, 4000, 6000, and 7000 in T6 temper. Such alloys are selected for sufficient high strength, low residual stress condition, wear resistance, and weldability.

In this example, the method 110 further comprises in box 114 providing an inertia ring 234 disposed in the open cavity 232 to provide damper inertia. The method 110 further comprises in box 120 providing a plate 240 to be disposed on the lip 230 of the hub 212 and extending to the step 220 of the wall 214 to close the inertia ring 234 in the open cavity 232. As shown, the plate 240 has a second faying surface 241 and is to be placed in abutment (see below) with the first faying surface 215 of the wall. The plate 240 has a second arcuate portion 242 arranged to be in cooperation with the first arcuate portion 222 (see below) defining a hollow channel 244 radially disposed about the wall 214 of the hub 212.

The cover plate 240 may comprise aluminum alloys some of which are known blends such as AA4000, AA5000, and AA6000. Such alloys may be heat treated or cold worked for strength and weldability purposes off base or parent material and particularly for high strength of the weld to maintain. Moreover, the inertia ring may be comprised of aluminum alloy, cast or forged. Additionally, viscous silicone may be used to fill the remainder of the cavity.

As shown in FIG. 5, the method 110 further comprises in box 122 arranging or moving the wall 214 and the plate 240 such that the first and second faying surfaces 215, 241 are in abutting contact. The step of arranging may be accomplished with any suitable stationary fixture to hold the hub in place and a movable robotic arm to dispose the plate on the lip and step portion such that the plate is in abutment with the wall to define the hollow channel.

Moreover, the method 110 further comprises in box 124 directing a laser beam onto an external surface 243 of the hub 212 effective to form a weld nugget (see FIG. 3) disposed between the hub and the plate. As discussed above, the weld nugget has a root extending therethrough concurrent with the rotational axis to join the hub and the plate. The root has a tip defining a profile such that the hollow channel is disposed at an angle tangent to the profile to lessen cracking due to stress concentration.

As described above and shown in FIGS. 3-4, the hollow channel is arranged tangent to the profile at the angle relative to the centerline. In one example, the angle of the hollow channel is between 10° and 50° relative to the centerline or rotational axis. the angle of the hollow channel between 15° and 30° relative to the centerline. In another embodiment, the angle of the hollow channel is between 20° and 25° relative to the centerline.

In one example, the hollow channel may have a cross section having an oval shape as shown in previous figures. However, the hollow channel may have a cross section having a circular shape, a rectangular shape, or any other suitable shape without departing from the scope or spirit of the present disclosure.

In this example, the laser beam may be a single beam laser from a fiber laser source. In one example, the power output of the laser beam may be 3 KW to 7 KW, and preferably 5-6 KW. The laser beam may have a welding speed of 3 m/min to 6 m/min, and preferably 5-6 m/min. Moreover, the laser beam may have a spot size of 100 micron to 200 micron, a focal position at 0 mm with preferably argon gas shielding.

In another example, laser welding may be accomplished by way of electron beam welding having power sets at 600 J/cm to 800 J/cm, a welding speed of 1.5 m/min to 3.0 m/min with an electron beam spot at 0.1 mm to 0.2 mm in size. Other laser welding methods and systems may be used, such as fusion welding, without departing from the spirit or scope of the present disclosure. In this example, it is to be understood that laser weld nugget may penetrate or extend into the damper by 5 mm to 6 mm exceeding thickness of the cover plate, and may have a weld crown width of 2 mm to 3 mm. Additionally, the weld may have a depth to width ratio of 2 to 3.

FIG. 7 illustrates a schematic view of a system 310 for making a laser welded damper 10 (FIGS. 1-4) by way of the method 110 discussed above. The system 310 comprises a damper to be laser welded such as the damper 210 in FIG. 6. The damper comprises a hub having a circular wall extending about a rotational axis of the damper to define a bore formed therethrough. The wall has a first faying surface and comprises a step portion radially extending therefrom. The step has a first arcuate portion formed thereon. The hub comprises a body portion radially extending from the wall to a lip to define an open cavity. In one embodiment, the hub comprises aluminum alloys some of which are known blends such as AA2000, 4000, 6000, and 7000 in T6 temper. Such alloys are selected for strength, wear resistance, and weldability.

The damper further comprises an inertia ring disposed in the open cavity to provide damper inertia. The damper further comprises a plate disposed on the lip of the hub and extending to the step of the wall to close the inertia ring in the open cavity. The plate has a second faying surface and is in abutment with the first faying surface of the wall. The plate has a second arcuate portion arranged to be in cooperation with the first arcuate portion defining a hollow channel radially disposed about the wall of the hub.

The cover plate may comprise aluminum alloys some of which are known blends such as AA4000, AA5000, and AA6000. Such alloys may be heat treated or cold worked for strength and weldability purposes. Moreover, the inertia ring may be comprised of aluminum alloy, cast or forged. Additionally, viscous silicone may be used to fill the remainder of the cavity.

As shown in FIG. 7, the system 310 further comprises a stationary unit 312 arranged or configured to arrange the wall and the plate such that the first and second faying surfaces are in abutting contact. In one embodiment, the stationary unit 312 may be any suitable stationary table equipped to receive and hold the hub and plate in place for preparation of laser welding. It is to be understood that a movable robot arm 314 or any other suitable movable unit may be used with the stationary unit to arrange the wall and the plate such that the first and second faying surfaces are in abutting contact.

Moreover, the system 310 further comprises a laser unit 316 to direct a laser beam 318 onto an external surface of the hub effective to form a weld nugget disposed between the hub and the plate. In one embodiment, the laser unit 316 may include a laser tool 320 arranged to emit a laser beam on the external surface of the hub to effectively form a weld nugget disposed between the hub and the plate. As in FIG. 4, the weld nugget has a root extending into the hub and plate, concurrent with the rotational axis to join the hub and the plate. The root has a tip defining a profile such that the hollow channel is disposed at an angle tangent to the profile to lessen cracking due to stress.

In one example, the angle of the hollow channel is between 10° and 50° relative to the rotational axis. In another example, the angle of the hollow channel between 15° and 30° relative to the rotational axis. In another embodiment, the angle of the hollow channel is between 20° and 25° relative to the rotational axis.

The laser beam may be a single beam laser from a fiber laser source. In one example, the power output of the laser beam may be 3 KW to 7 KW, and preferably 5-6 KW. The laser beam may have a welding speed of 3 m/min to 6 m/min, and preferably 5-6 m/min. Moreover, the laser beam may have a spot size of 100 micron to 200 micron, a focal position at 0 mm with preferably argon gas shielding.

In another example, laser welding may be accomplished by way of electron beam welding having power sets at 600 J/cm to 800 J/cm, a welding speed of 1.5 m/min to 3.0 m/min with an electron beam spot at 0.1 mm to 0.2 mm in size. Other laser welding methods and systems may be used, such as fusion welding, without departing from the spirit or scope of the present disclosure. In this example, it is to be understood that laser weld nugget may penetrate or extend into the damper by 5 mm to 6 mm exceeding thickness of the cover plate, and may have a weld crown width of 2 mm to 3 mm. Additionally, the weld may have a depth to width ratio of 2 to 3.

In yet another example, the laser tool is a YAG Solid State laser having a laser spot size of 4 mm, a power of 4800 W, a laser beam velocity of 900 mm/s, and a hardening temperature of 1020° C. It is to be understood that other laser tools may be used without departing from the spirit or scope of the present disclosure.

Referring to FIG. 7, the system 310 further comprises a controller 322 in communication with the stationary unit 312, the robotic arm 314, and the laser unit 316. The controller 42 is configured to control the stationary unit 312, the robotic arm 314, and the laser unit 316. Moreover, the system 310 comprises a power source 324 configured to power controller 322, the stationary unit 312, the robotic arm 314, and the laser unit 316.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A damper for suppressing vibrations of a crankshaft of a vehicle, the damper comprising:
    a hub having a circular wall extending about a rotational axis of the damper to define a bore formed therethrough, the wall comprising a step portion radially extending therefrom and having a first arcuate portion formed thereon, the hub comprising a body portion radially extending from the wall to a lip to define an open cavity;
    an inertia ring disposed in the open cavity to provide damper inertia;
    a plate disposed on the lip of the hub and extending to the step portion of the wall to close the inertia ring in the open cavity, the plate being in abutment with the wall and having a second arcuate portion arranged to be in cooperation with the first arcuate portion defining a hollow channel radially disposed about the wall of the hub; and
    a weld nugget disposed between the hub and the plate, the weld nugget having a root extending therethrough concurrent with the rotational axis defining a centerline to join the hub and the plate, the root having a tip defining a profile such that the hollow channel is disposed at an angle tangent to the profile to lessen cracking due to stress.

2. The damper of claim 1 wherein the angle of the hollow channel is between 10° and 50° relative to the centerline or the rotational axis.

3. The damper of claim 1 wherein the angle of the hollow channel is between 15° and 30° relative to the centerline or the rotational axis.

4. The damper of claim 1 wherein the angle of the hollow channel is between 20° and 25° relative to the centerline or the rotational axis and wherein the damper comprises aluminum alloy.

5. The damper of claim 1 wherein the weld nugget extends into the damper by 5 mm to 6 mm and has a weld crown width of 2 mm to 3 mm.

6. The damper of claim 1 wherein the weld nugget has a depth to width ratio of 2 to 3.

7. The damper of claim 1 wherein the hollow channel has a cross section having a diameter of between 0.8 mm and 1.5 mm.

8. A method of making a laser welded damper having enhanced fatigue performance, the method comprising:
    providing a hub having a circular wall extending about a rotational axis of the damper to define a bore formed therethrough, the wall having a first faying surface and comprising a step portion radially extending therefrom, the step portion having a first arcuate portion formed thereon, the hub comprising a body portion radially extending from the wall to a lip to define an open cavity;
    providing an inertia ring disposed in the open cavity to provide damper inertia;
    providing a plate disposed on the lip of the hub and extending to the step portion of the wall to close the inertia ring in the open cavity, the plate having a second faying surface and being in abutment with the first faying surface of the wall, the plate having a second arcuate portion arranged to be in cooperation with the first arcuate portion defining a hollow channel radially disposed about the wall of the hub;
    arranging the wall and the plate such that the first and second faying surfaces are in abutting contact; and
    directing a laser beam onto an external surface of the hub effective to form a weld nugget disposed between the hub and the plate, the weld nugget having a root extending therethrough concurrent with the rotational axis defining a centerline to join the hub and the plate, the root having a tip defining a profile such that the hollow channel is disposed at an angle tangent to the profile to lessen cracking due to stress concentration.

9. The method of claim 8 wherein the angle of the hollow channel is between 10° and 50° relative to the centerline or the rotational axis.

10. The method of claim 8 wherein the angle of the hollow channel is between 15° and 30° relative to the centerline or the rotational axis.

11. The method of claim 8 wherein the angle of the hollow channel is between 20° and 25° relative to the centerline or the rotational axis.

12. The method of claim 8 wherein the hollow channel has a cross section having an oval shape.

13. The method of claim 8 wherein the hollow channel has a cross section having a circular shape.

14. The method of claim 8 wherein the laser beam is set at 600 J/cm to 800 J/cm and has a welding speed of 1.5 m/min to 3.0 m/min with an electron beam spot at 0.1 mm to 0.2 mm in diameter.

15. A damper for suppressing vibrations of a crankshaft of a vehicle, the damper comprising:
    a hub having a circular wall extending about a rotational axis of the damper to define a bore formed therethrough, the wall comprising a step portion radially extending therefrom and having a first arcuate portion formed thereon, the hub comprising a body portion radially extending from the wall to a lip to define an open cavity;

an inertia ring disposed in the open cavity to provide damper inertia;

a plate disposed on the lip of the hub and extending to the step portion of the wall to close the inertia ring in the open cavity, the plate being in abutment with the wall and having a second arcuate portion arranged to be in cooperation with the first arcuate portion defining a hollow channel radially disposed about the wall of the hub; and a weld nugget disposed between the hub and the plate, the weld nugget having a root extending therethrough concurrent with the rotational axis defining a centerline to join the hub and the plate, the root having a tip defining a profile such that the hollow channel is disposed at an angle tangent to the profile to lessen cracking due to stress, the angle of the hollow channel being between 10° and 50° relative to the rotational axis.

16. The damper of claim 15 wherein the angle of the hollow channel is between 15° and 30° relative to the centerline or the rotational axis.

17. The damper of claim 15 wherein the angle of the hollow channel is between 20° and 25° relative to the centerline or the rotational axis.

18. The damper of claim 15 wherein the hollow channel has a cross section having an oval shape.

19. The damper of claim 15 wherein the hollow channel has a cross section having a circular shape.

20. The damper of claim 15 wherein the hollow channel has a cross section having a diameter of between 0.8 mm and 1.5 mm.

* * * * *